United States Patent
Li

(10) Patent No.: US 8,267,190 B2
(45) Date of Patent: Sep. 18, 2012

(54) DIRECTION SWITCHING AND SPEED CONTROLLING DEVICE FOR A PNEUMATIC TOOL

(75) Inventor: Xiao-Rong Li, Taizhou (CN)

(73) Assignee: Zhejiang Rongpeng Air Tools Co., Ltd., Lunan Industrial Zone, Liqiao, Taizhou, Zhejiang (CN)

( * ) Notice: Subject to any disclaimer, the term of this patent is extended or adjusted under 35 U.S.C. 154(b) by 89 days.

(21) Appl. No.: 12/929,420

(22) Filed: Jan. 24, 2011

(65) Prior Publication Data

US 2011/0186315 A1    Aug. 4, 2011

(30) Foreign Application Priority Data

Feb. 1, 2010    (CN) .................... 2010 2 0119916 U

(51) Int. Cl.
*B25B 21/02* (2006.01)
*B25D 9/00* (2006.01)

(52) U.S. Cl. ................ 173/104; 173/93.5; 173/169

(58) Field of Classification Search .............. 173/93, 173/93.5, 104, 109, 168, 169
See application file for complete search history.

(56) References Cited

U.S. PATENT DOCUMENTS

| | | | | |
|---|---|---|---|---|
| 4,778,015 A * | 10/1988 | Jacobsson | | 173/169 |
| 5,377,769 A * | 1/1995 | Hasuo et al. | | 173/169 |
| 5,918,686 A * | 7/1999 | Izumisawa | | 173/20 |
| 6,443,239 B1 * | 9/2002 | Izumisawa | | 173/169 |
| 6,902,011 B2 * | 6/2005 | Hall | | 173/169 |
| 6,923,272 B2 * | 8/2005 | Jansson et al. | | 173/169 |
| 7,213,500 B2 * | 5/2007 | Chang | | 91/418 |
| 7,222,680 B2 * | 5/2007 | Livingston et al. | | 173/177 |
| 7,325,627 B2 * | 2/2008 | Tanji | | 173/169 |
| 7,445,055 B2 * | 11/2008 | Pusateri et al. | | 173/169 |
| 7,594,549 B2 * | 9/2009 | Hua | | 173/104 |
| 7,802,633 B2 * | 9/2010 | Kobayashi | | 173/218 |

* cited by examiner

*Primary Examiner* — Scott A. Smith

(57) ABSTRACT

A direction switching and speed controlling device for an air tool includes two holes provided respectively on two lateral sides of an air cylinder (2). Holes on one side are two air outlets (8), and two holes on another side are a forward rotation air inlet (13) and a reverse rotation air inlet (12). An air valve (7) has an indentation portion (9) provided on a lateral side thereof, the indentation portion (9) is engaged with teeth portion (10) provided on a lower end of a switch (6). At another end, the switch (6) includes an elongated portion (11) provided horizontally with a blind hole (14) provided in the center. A spring (3) is disposed into the hole (14) with a metal ball (4) attached to an end thereof. A valve cap (5) is provided on a bottom portion of a casing (1) with a plurality of spherical grooves (15) provided therein. The metal ball (4) and groove (15) are engaged through the restoration force of the spring (3).

1 Claim, 3 Drawing Sheets

DIRECTION SWITCHING AND SPEED CONTROLLING DEVICE FOR A PNEUMATIC TOOL

FIELD OF THE INVENTION

The present invention relates to a rotating direction switching and speed controlling device, more specifically a device employed in an air tool combining functions of reversible rotation shifting and speed adjusting with simplified mechanisms.

DESCRIPTION OF PRIOR ART

The conventional air tool includes two types of applications for the dual-direction rotation shifting and speed adjusting functions, one is by providing in two independent systems, and another having both functions linking by a valve shaft. For realizing the functions, both applications include a valve shaft having a specific shape, the shaft is set in a valve sheath, which corresponding the shape of the shaft. As the shaft is rotated, it switches different air inlets and rotating direction change and speed adjustment are performed. However, the valve shaft must fit in the sheath precisely, therefore manufacture of the shaft and sheath requires a process with high precision, increasing the time and cost of manufacturing.

SUMMARY OF THE INVENTION

To solve above-mentioned shortcoming, the present invention is a device allowing the switch of rotating direction and adjustment of inlet air controlled by a same switch knob set on the bottom of the handle of an air tool. The mechanism and internal structure of the device are simplified and components are made of engineering plastics, instead of metal for reducing weight and cost.

The rotating direction switching and speed controlling device for an air tool consists of a casing, an air cylinder, a spring, a metal ball, a valve cap, a switch and an air valve; wherein said casing is provided on an outmost portion sheathing the whole mechanism.

Two holes are provided respectively on two lateral sides of the air cylinder. Holes on one side are two air outlets, which are arranged vertically on the air cylinder; two holes on another side are a forward rotation air inlet and a reverse rotation air inlet, which are arranged horizontally on the air cylinder. An air outlet of said air valve is connected to one of said air inlets at one time, thus when the outlet of said air valve is connected to forward rotation inlet, the reverse rotation inlet is spaced and not connected, and vice versa.

The air valve has an indentation portion provided on a lateral side thereof, said indentation portion is engaged with teeth portion provided on a lower end of the switch. Another end of the switch includes a blind hole, set in a center portion thereof. The spring is disposed into the hole with the metal ball attached to an end thereof, thus a partial of the ball is exposed from an opening of the hole. The valve cap is provided on a bottom portion of the casing with a plurality of spherical grooves provided therein for receiving the exposed portion of said metal ball.

By moving the trigger horizontally, the rotating direction and speed can be controlled simultaneously, making the functions of air tool convenient to the user.

DETAILED DESCRIPTION OF PREFERRED EMBODIMENT

The description of embodiment of the present invention is described in detail hereinafter according to the appended drawings.

Figure 1:
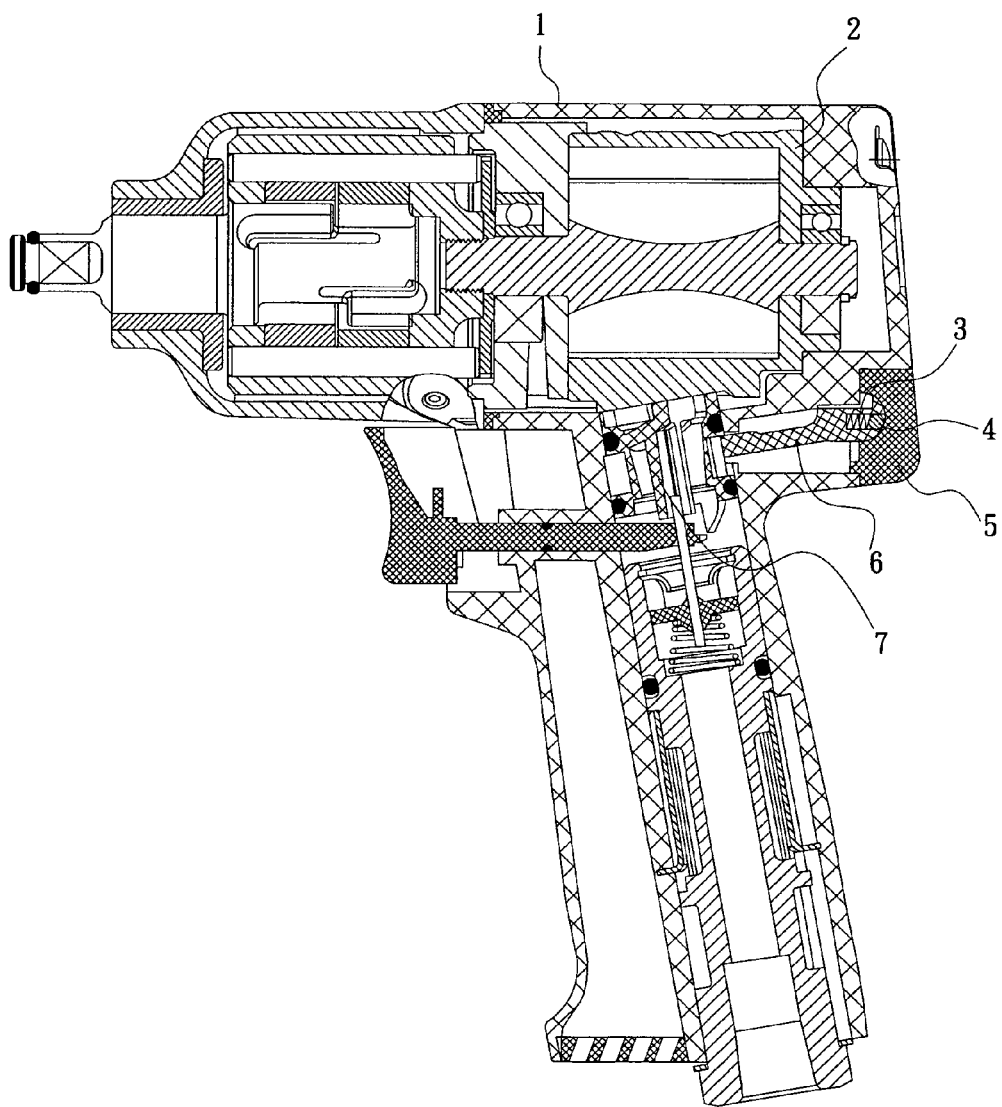
FIG. 1 is a cross sectional view of an air tool equipped with the device claimed in the present invention.
Figure 2:
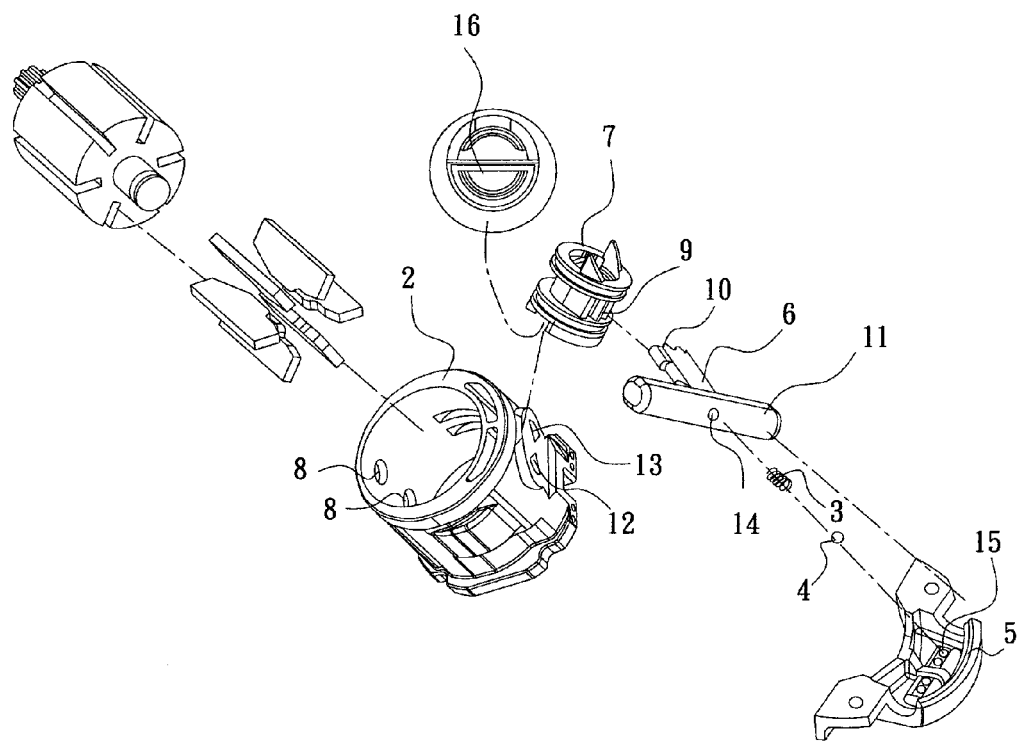
FIG. 2 is an exploded view of the present invention.

Referring to FIGS. 1 and 2, a direction switching and speed controlling device for an air tool consists of a casing (1), an air cylinder (2), a spring (3), a metal ball (4), a valve cap (5), a switch (6) and an air valve (7); wherein said casing (1) is provided on the outmost for sheathing the whole means.

Two holes are provided respectively on two lateral sides of the air cylinder (2). Holes on one side are two air outlets (8), which are arranged vertically on the air cylinder (2); two holes on another side are a forward rotation air inlet (13) and a reverse rotation air inlet (12), which are arranged horizontally thereon. The air valve (7) is attached to a side wall of the air cylinder (2), and an air outlet (16) provided on a bottom thereof is connected to one of said air inlets (12, 13) each time, thus when the outlet (16) of said air valve (7) is connected to forward rotation inlet (13), the reverse rotation inlet (12) will be shut, and vice versa.

Said valve (7) has an indentation portion (9) provided on a lateral side thereof, said indentation portion (9) is engaged with the teeth portion (10) provided of the switch (6). Therefore, when the switch (6) is moved horizontally, it drives the air valve (7) to rotate clockwise/counterclockwise.

The switch (6) is preferably to have a T-shape with said teeth portion (10) provided on the lower bottom. Another end thereof includes an elongated portion (11) provided horizontally with a blind hole (14) provided in the center. The spring (3) is disposed into the hole (14) with the metal ball (4) attached to an end thereof, thus a partial of the ball (4) is exposed from an opening of the hole (14). The valve cap (5) is provided on a bottom portion of the casing (1) with a plurality of spherical grooves (15) provided therein. Said metal ball (4) and groove (15) are engaged through the restoration force of the spring (3).

The embodiment can have at least two output speed options, regular and maximum in both clockwise and counterclockwise rotating directions, making at least a total four combinations can be achieved. Mechanisms of the device in above states are described hereinafter.

Figure 3:
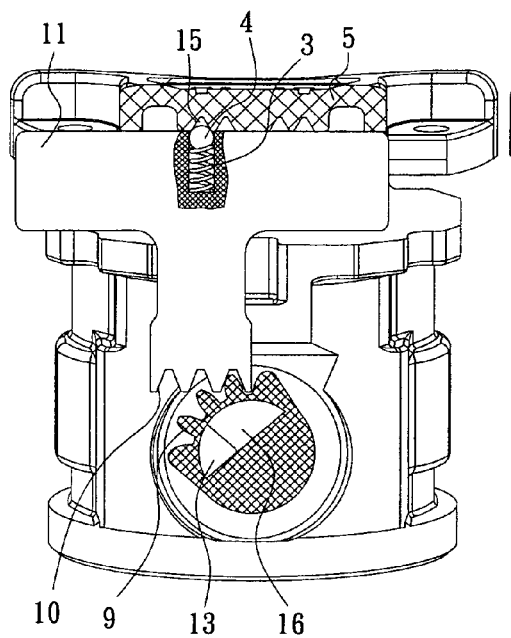
FIG. 3 is an illustrative view showing positions of the air valve and switch in a forward direction and maximum speed state.

FIG. 3 shows the device functioning with forward rotating direction and maximum speed. The metal ball (4) butts the leftmost groove (15), and the switch (6) drives the air valve (7) to have the forward rotation air inlet (13) completely exposed from the air outlet (16) and for providing maximized high-pressure air flow.

Figure 4:
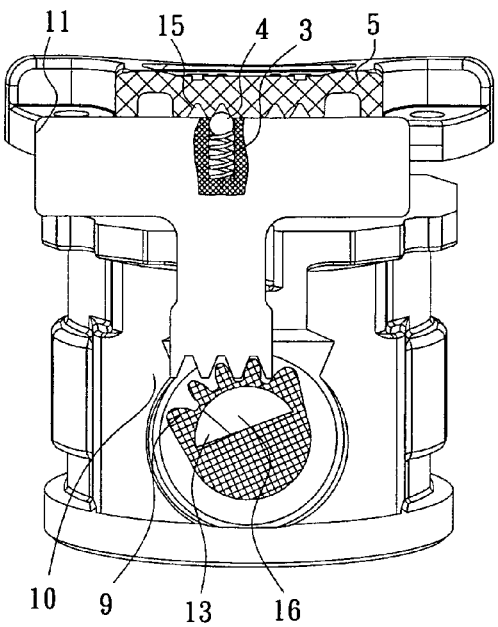
FIG. 4 is an illustrative view showing positions of the air valve and switch in a forward direction and regular speed state.

FIG. 4 shows the device functioning with forward rotating direction and regular speed. The metal ball (4) is switched to butts the second groove (15) from the left by moving the elongated portion (11) of the switch (6), and the teeth (10) of the switch (6) drives the indentations (9) of the air valve (7) to have the forward rotation air inlet (13) partially exposed from the air outlet (16) for providing a regular high-pressure air flow. Either the air inlet (13) is fully or partially exposed, the reverse rotation air inlet (12), which set in an opposite position, is maintained shut and covered by the air valve (7).

Figure 5:
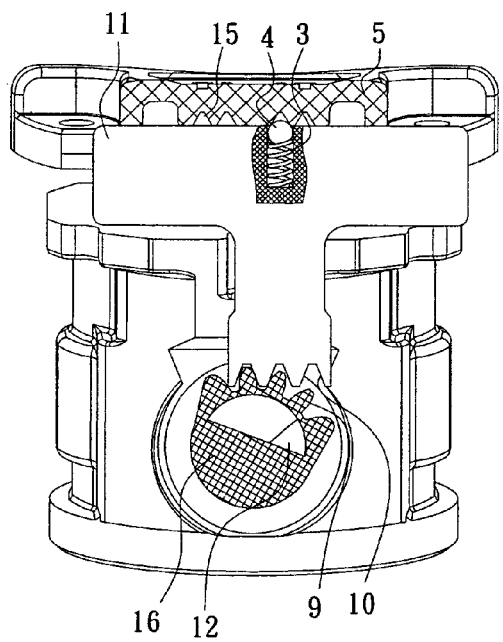
FIG. 5 is an illustrative view showing positions of the air valve and switch in a reverse direction and regular speed state.

FIG. 5 shows the device functioning with reverse rotating direction and regular speed. Keep pushing the elongated portion (11) of the switch (6) until metal ball (4) is switched to butts the second groove (15) from the right, and the teeth (10) of the switch (6) drives the indentations (9) of the air valve (7) to have the reverse rotation air inlet (12) partially exposed from the air outlet (16) for providing a regular high-pressure air flow.

Figure 6:
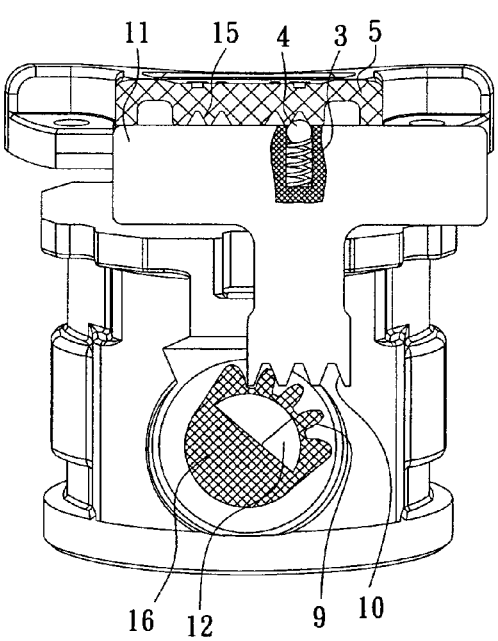
FIG. 6 is an illustrative view showing positions of the air valve and switch in a reverse direction and maximum speed state.

FIG. 6 illustrates the device functioning with reverse rotating direction and maximum speed. Keep pushing the elongated portion (11) of the switch (6) until metal ball (4) is switched to butts the rightmost groove (15), the teeth (10) of the switch (6) drives the indentations (9) of the air valve (7) to have the reverse rotation air inlet (12) fully exposed from the air outlet (16) for providing maximized high pressure air flow. Either the air inlet (12) is fully or partially exposed, the reverse rotation air inlet (13), which set in an opposite position, is maintained shut and covered by the air valve (7).

The invention claimed is:

1. A direction switching and speed controlling device for an air tool comprising a casing, an air cylinder, a spring, a metal ball, a valve cap, a switch and an air valve;

wherein said casing is provided on an outmost portion; two holes are provided respectively on two lateral sides of the air cylinder; holes on one side are two air outlets and are arranged vertically on the air cylinder; two holes on another side are a forward rotation air inlet and a reverse rotation air inlet, arranged horizontally on the air cylinder; said air valve is attached to a lateral side of the air cylinder, where an air outlet provided on a bottom thereof is connected to one of said air inlets by selection;

the air valve having an indentation portion provided on a lateral side thereof, said indentation portion is engaged with teeth portion provided on a lower end of said switch; another end of the switch is an elongated portion extended horizontally with a blind hole set in a center portion thereof; said spring is disposed into the hole with the metal ball attached to an end thereof, thus a partial of the ball is exposed from an opening of the hole; said valve cap is provided on a bottom portion of the casing with a plurality of spherical grooves provided therein for receiving said metal ball.

\* \* \* \* \*